US006968749B2

(12) United States Patent
Chen et al.

(10) Patent No.: US 6,968,749 B2

(45) Date of Patent: Nov. 29, 2005

(54) PORTABLE AUTOMATED PIPETTE

(75) Inventors: Tai Ho Chen, Taipei (TW); Chung-Che Lo, Taipei (TW); Te-Hua Lee, Taipei (TW); Jackie Yan, Taipei (TW); Wen-Hsiung Lin, Taipei (TW)

(73) Assignee: Arise Biotech Corporation, Taipei (TW)

( * ) Notice: Subject to any disclaimer, the term of this patent is extended or adjusted under 35 U.S.C. 154(b) by 0 days.

(21) Appl. No.: 10/300,761

(22) Filed: Nov. 21, 2002

(65) Prior Publication Data

US 2004/0099067 A1 May 27, 2004

(51) Int. Cl.$^{7}$ .............................. B01L 3/02; G01N 1/10

(52) U.S. Cl. ............................... 73/863.32; 73/863.31; 422/99; 422/100

(58) Field of Search ......................... 73/863.31, 863.32, 73/863.33; 422/62–67, 99, 100

(56) References Cited

U.S. PATENT DOCUMENTS 3,915,651 A * 10/1975 Nishi ...................... 73/864.16
4,821,586 A * 4/1989 Scordato et al. ......... 73/864.18
5,021,217 A * 6/1991 Oshikubo .................. 422/100
5,465,629 A * 11/1995 Waylett, Jr. .............. 73/864.24
5,762,873 A * 6/1998 Fanning et al. ............... 422/65
6,170,343 B1 * 1/2001 Conley et al. ........... 73/864.18
6,451,263 B1 * 9/2002 Sarrine ....................... 422/100

* cited by examiner

*Primary Examiner*—Hezron Williams
*Assistant Examiner*—David A. Rogers

(57) ABSTRACT

A portable automated pipette includes a linear actuator, a flywheel, an optical coupler and a control circuit. The linear actuator has a step motor and is connected to a control circuit. The step motor has a rotor and is connected to a flywheel. The flywheel includes a plurality of apertures formed on an internal surface of the flywheel. An optical coupler is arranged on two opposite sides of the flywheel and is connected to the control circuit. By means of the step motor, the portable automated pipette can monitor the displacement of the threaded rod to accurately control the picking/dispensing volume of liquid. Furthermore, the portable automated pipette can detect whether an aspirator is removed and can alert the user to check whether there is a wrong operation.

5 Claims, 11 Drawing Sheets

PORTABLE AUTOMATED PIPETTE

BACKGROUND OF THE INVENTION

1. Field of the Invention

The invention relates to a portable automated pipette. More particularly, the invention provides a portable automated pipette having a step motor with feedback function.

2. Description of the Related Art

A pipette is a device that, like a syringe, picks up or dispenses a predetermined volume of liquid by a pumping means. The pumping means includes a motor transmission mechanism that can linearly move, and an aspirator removing mechanism. The pumping means is usually associated with a control circuit to control one or more aspirators. For example, the U.S. Pat. No. 4,671,123, U.S. Pat. No. 4,905,526, and U.S. Pat. No. 6,254,832, which are incorporated by reference herein, disclose pipettes that pick up or dispense a constant volume of liquid.

However, it is difficult to accurately keep a rotational speed of the motor transmission mechanism constant due to the manual operation or the liquid viscosity. For example, picking up 1 $\mu$l of liquid normally needs 100 revolutions of the motor. If a problem of manual operational occurs, the motor only runs, for example, 98 revolutions, which can not meet the requirement of accurate liquid picking. Furthermore, the pipette is incapable of detecting whether an aspirator is removed.

SUMMARY OF THE INVENTION

It is therefore an object of the invention to provide a portable automated pipette that has a step motor with a feedback function to monitor the displacement of a threaded rod to accurately control the picking/dispensing volume of liquid.

It is another object of the invention to provide a portable automated pipette that can detect whether an aspirator is removed and alert the user to check whether a wrong operation has occurred.

It is still another object of the invention to provide a portable automated pipette that can adjust the displacement of an aspirator casing relative to a pipette housing, thereby an aspirator head can receive aspirators available from different suppliers.

In order to achieve the above and other objectives, a portable automated pipette having a step motor with a feedback function is provided. The pipette of the invention includes a linear actuator that has a step motor and is connected to a control circuit. The step motor has a rotor and is connected to a flywheel. The flywheel includes a plurality of apertures formed on an internal surface thereof. An optical coupler is arranged on two opposite sides of the flywheel and is connected to the control circuit. The optical coupler detects pulse signals from the apertures and sends the pulse signals to the control circuit. The control circuit receives the pulse signals sent from the optical coupler and compares the received pulse signals with predetermined pulse signals. The control circuit drives the step motor to offset the detected pulse signals when there is deviation between the detected pulse signals and the predetermined pulse signals.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
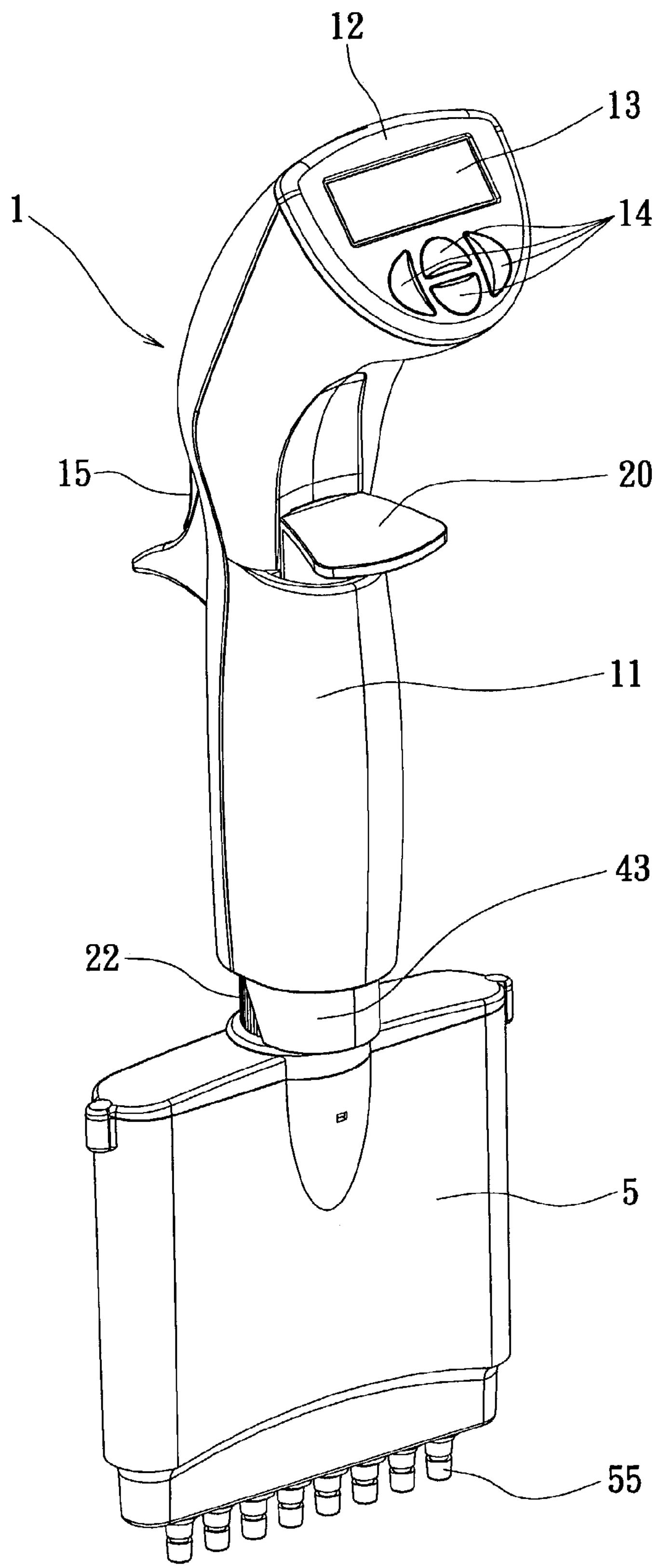
FIG. 1 is a perspective view of a portable automated-pipette according to one embodiment of the invention.
Figure 2:
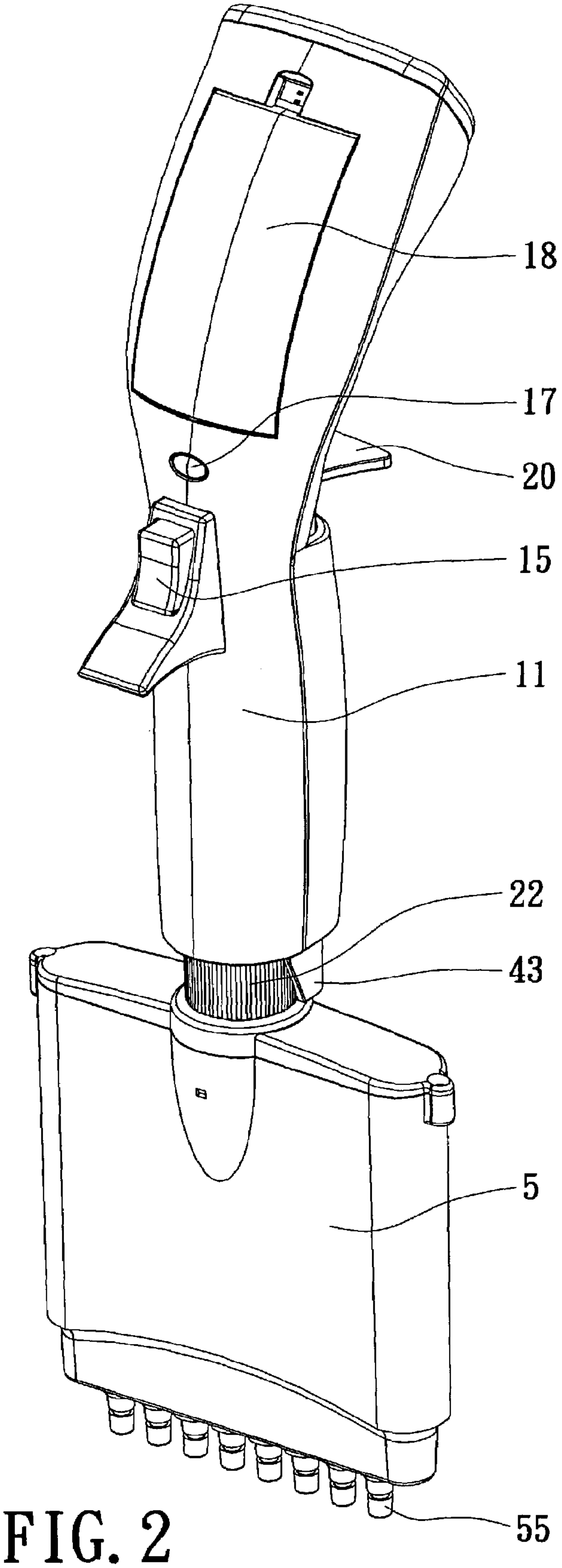
FIG. 2 is a perspective view of a portable automated pipette taken from an angle of view different from that of FIG. 1 according to one embodiment of the invention.
Figure 3:
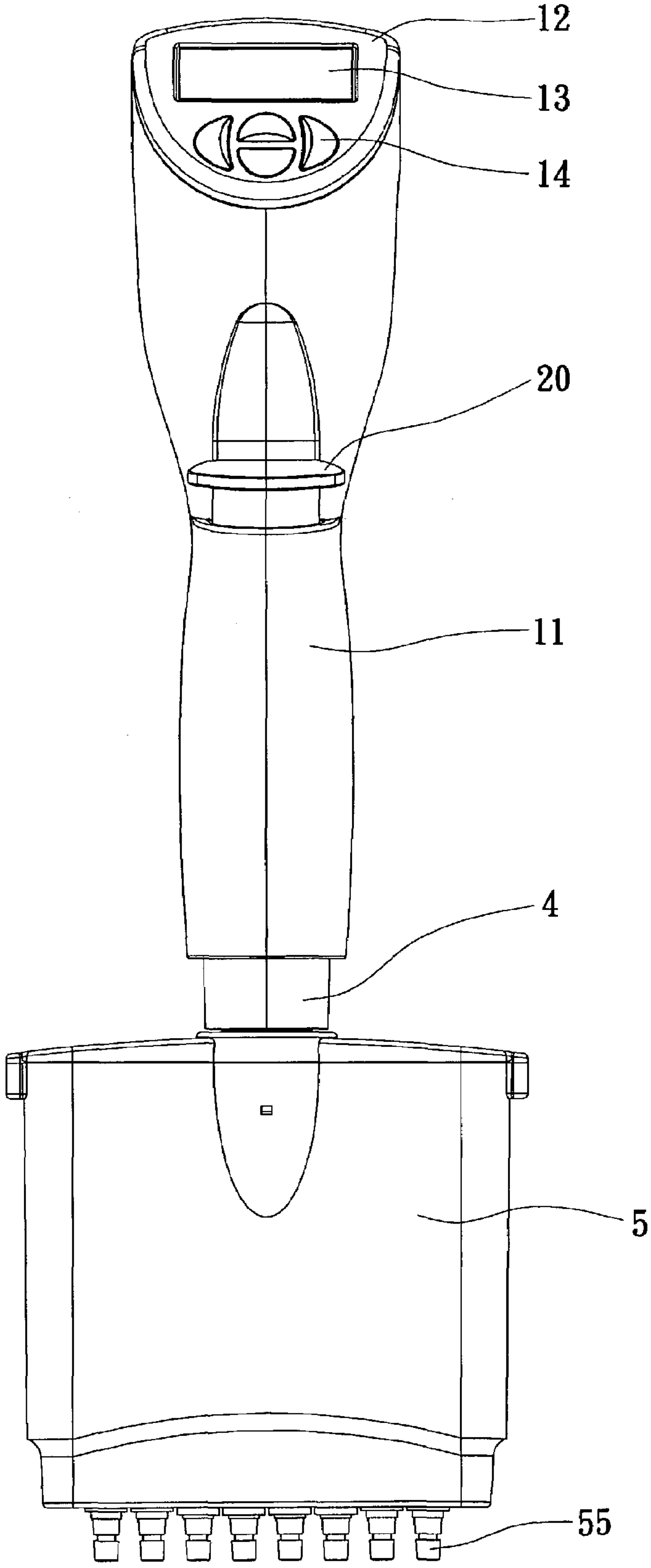
FIG. 3 is a front view of a portable automated pipette according to one embodiment of the invention.
Figure 4:
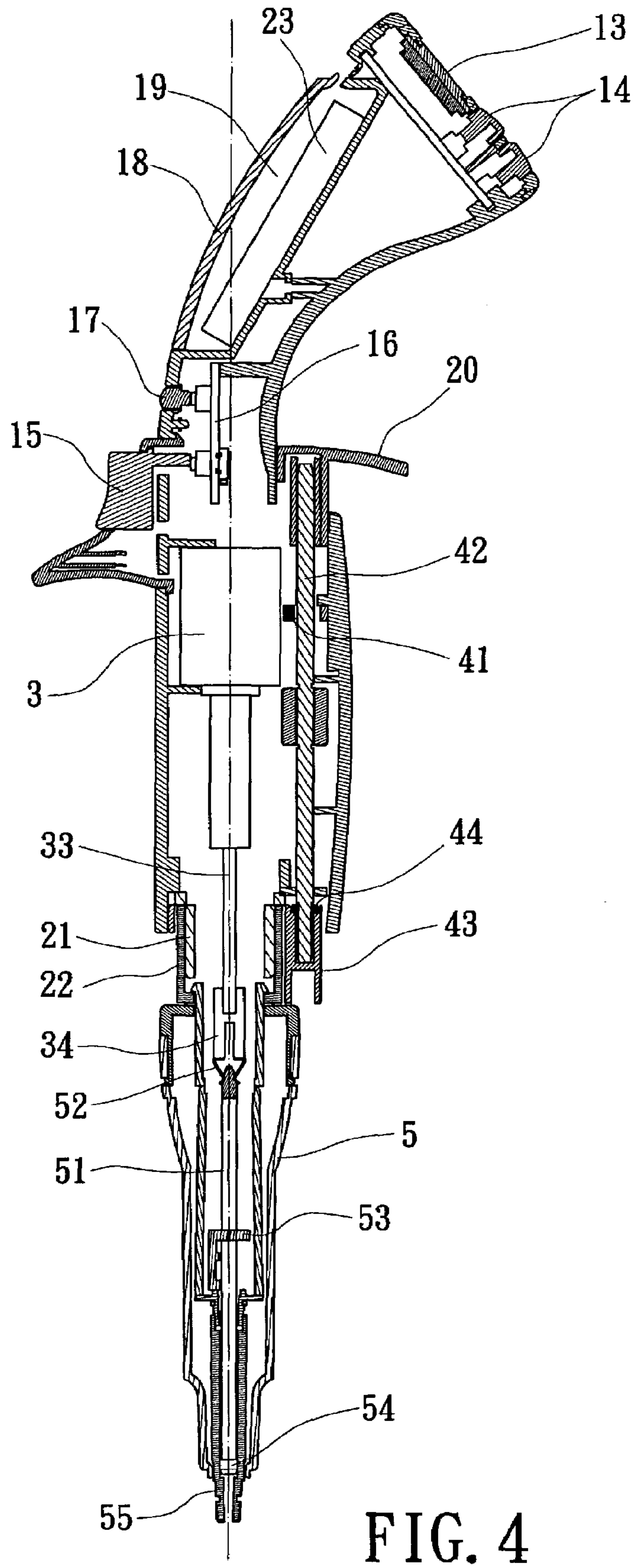
FIG. 4 is a cross-sectional view of a portable automated pipette according to one embodiment of the invention.
Figure 5:
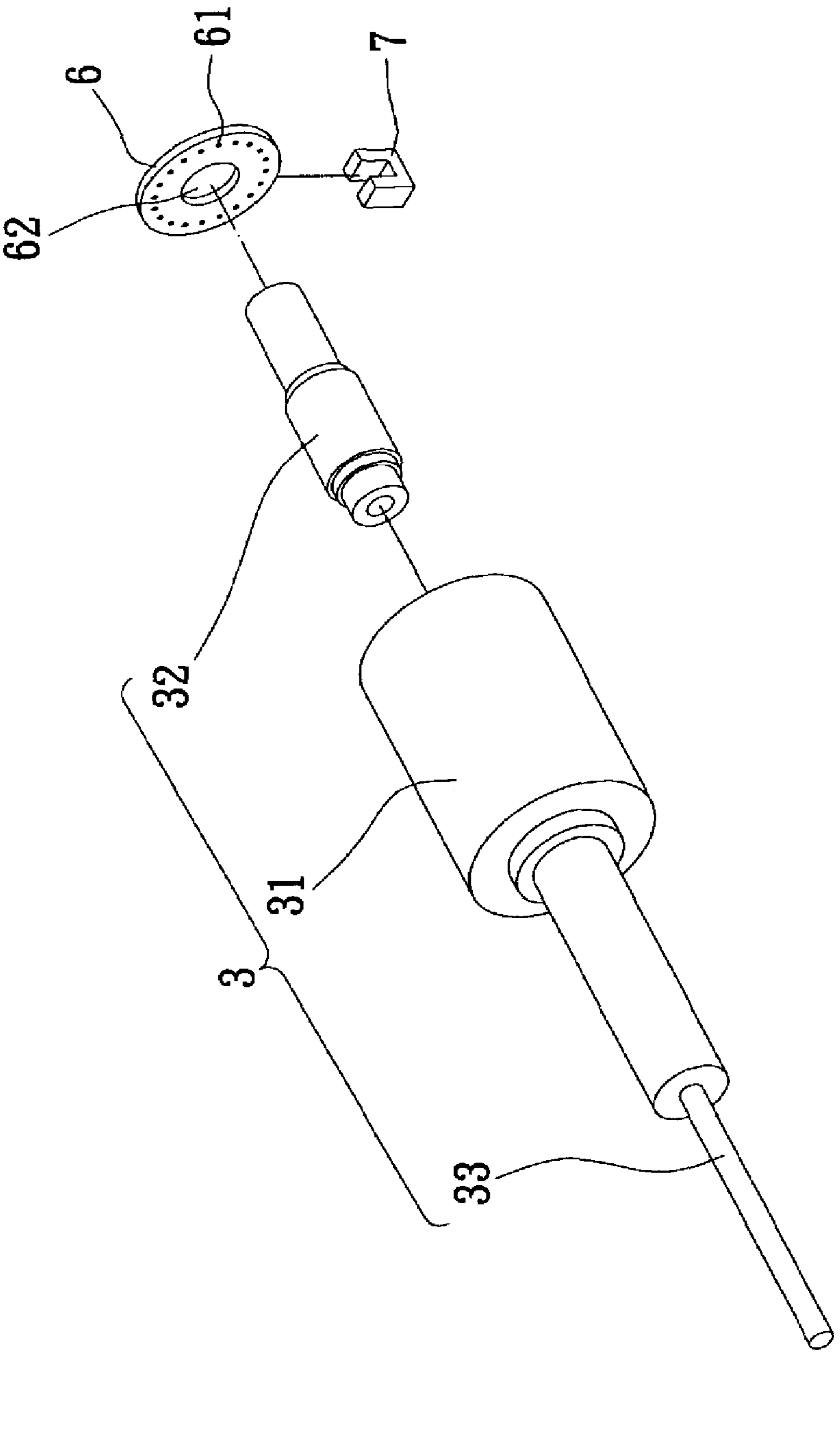
FIG. 5 is an exploded view particularly showing a step motor, a rotor, a flywheel and an optical coupler mounted in a portable automated pipette according to one embodiment of the invention.
Figure 6:
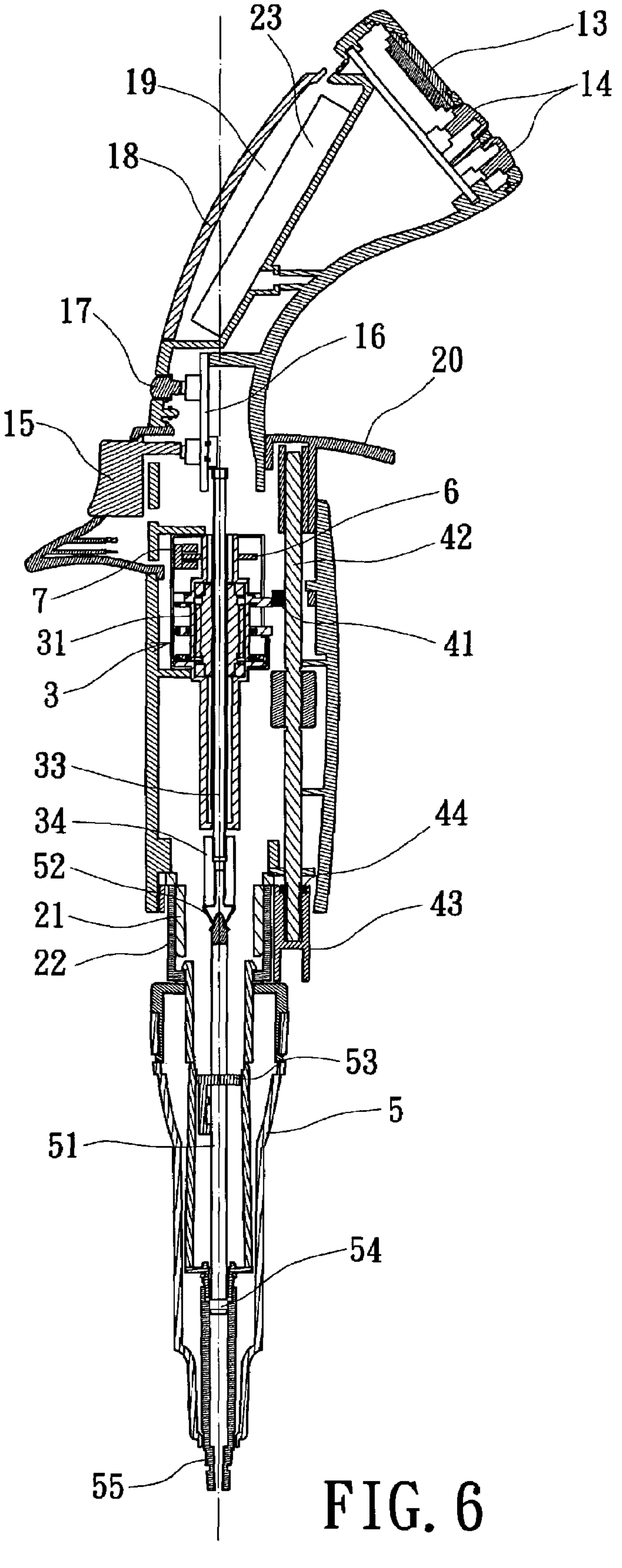
FIG. 6 is a cross-sectional view of a portable automated pipette according to one embodiment of the invention.
Figure 7:
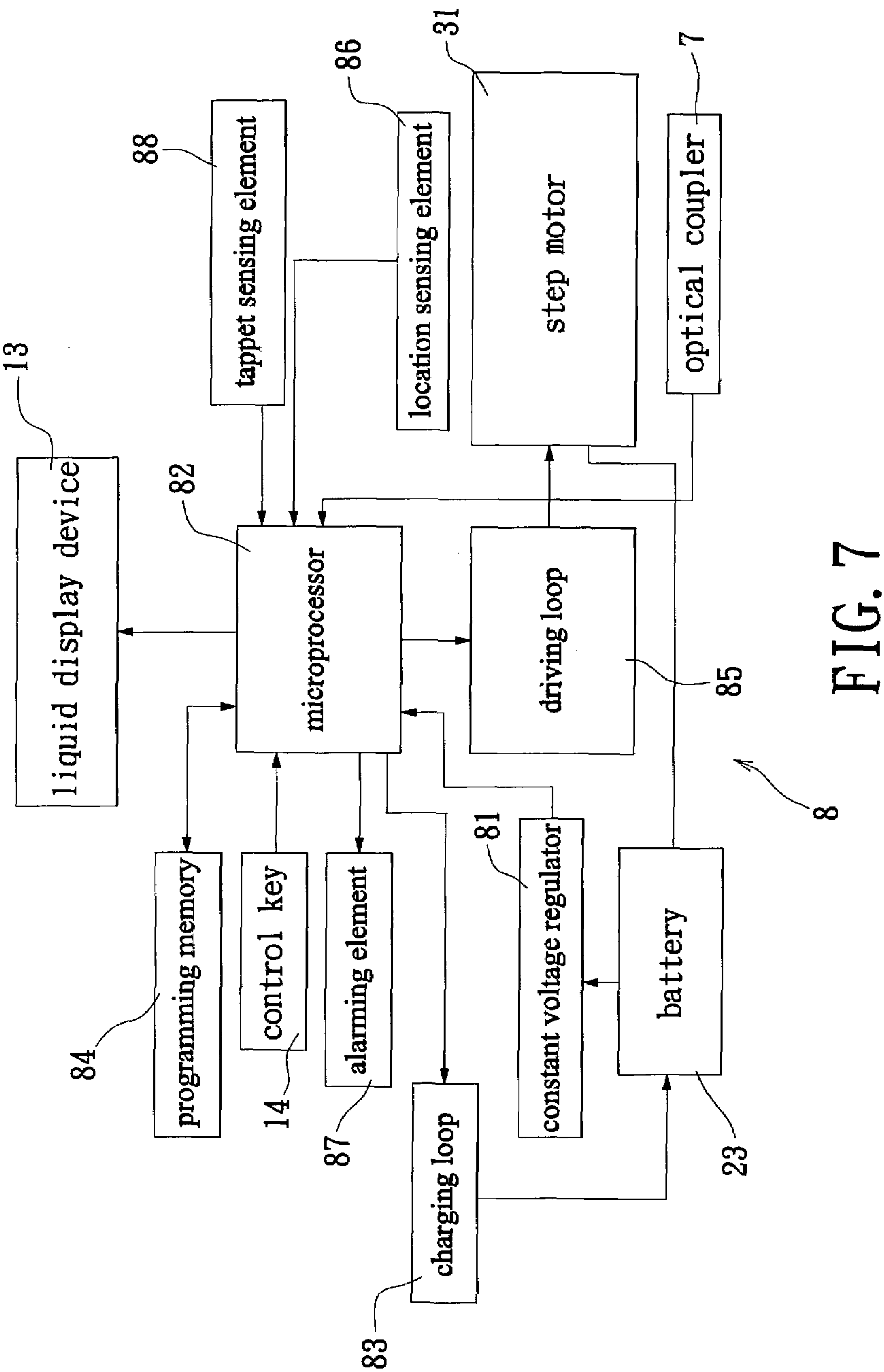
FIG. 7 is a block diagram of a portable automated pipette according to one embodiment of the invention.

Wherever possible in the following description, like reference numerals will refer to like elements and parts unless otherwise illustrated. Referring to FIG. 1 to FIG. 7, a portable automated pipette of the invention includes a housing 1, a linear actuator 3, an adjusting device 4, an aspirator casing 5, a flywheel 6, an optical coupler 7 and a control circuit 8.

The housing 1 includes a handheld section 11 and a panel 12 above the handheld section 11. A liquid crystal display (LCD) 13 and a plurality of control keys 14 are mounted on the panel 12. The control keys 14 include, for example, an operating mode key, a motor speed key and a liquid picking/dispensing volume control key. At a front side of the handheld section 11 is mounted a liquid picking/dispensing switch 15 and a reset key 17. A circuit board 16 is mounted inside the housing 1, corresponding to the liquid picking/dispensing switch 15 and the reset key 17. A battery lid 18 is pivotally mounted on the housing 1 above the liquid picking/dispensing switch 15 and the reset key 17 to cover a battery 23 held in an accommodating space 19 inside the housing 1. An aspirator withdrawing key 20 is mounted on a rear side of the handheld section 11. A bottom of the handheld section 11 is connected to a nut 22 via a connecting member 21, a bottom of the nut 22 being connected to an aspirator casing 5 that has a shape generally parallelepiped.

The linear actuator 3 is mounted inside the handheld section 11. In this embodiment of the invention, the actuator 3 includes a step motor 31. The step motor 31 has a rotor 32 pivotally connected to a threaded rod 33, a lower end of the threaded rod 33 being connected to a shaft connector 34.

The adjusting device 4 is mounted inside the handheld section 11 and includes a tappet 42 and a tappet socket 41 for fitting the tappet 42. A lower end of the tappet 42 is attached to a pad 43. An adjusting ring 44 for adjusting a displacement of the handheld section 11 relative to the aspirator casing 5 is further attached on the pad 43. When the aspirator withdrawing key 20 is pressed against an upper end of the tappet 42, the pad 43 moves downwardly together with the aspirator casing 5.

The aspirator casing 5 includes a propelling shaft 51 therein. An upper end of the propelling shaft 51 is connected to the shaft connector 34 via a clip 52. A lower end of the propelling shaft 51 is connected to a plunger 53 that has a manifold 54 connected to a plurality of aspirator heads 55 for respectively connecting external aspirators.

The flywheel 6 has a central shaft hole 62 for receiving the rotor 32. A plurality of apertures 61 are formed around the central shaft hole 62 on an internal surface of the flywheel 6. The flywheel 6 is driven by the motor 31.

The optical coupler 7 is arranged on both opposite sides of the flywheel 6 and connected to the control circuit 8. The optical coupler 7 detects pulse signals from the apertures 61 and sends the detected pulse signals to the control circuit 8. The control circuit 8 compares the received pulse signals with predetermined pulse signals. If there is deviation between the detected pulse signals and the predetermined pulse signals, the control circuit 8 drives the step motor 31 to offset the received pulse signals.

The control circuit 8 is formed on the circuit board 16, and has a constant voltage regulator 81 to convert a voltage of the battery 23 into a direct current (DC) voltage for supplying an operational voltage to a microprocessor 82. Between the microprocessor 82 and the battery 23 is formed a charging loop 83 that works when a power of the battery 23 is not sufficient to keep supplying power to the pipette. The microprocessor 82 is connected to a programming memory 84. A driving loop 85 connects the microprocessor 82 to the step motor 31. The driving loop 85 controls the step motor 31 based on the pulse signals from the microprocessor 82.

The microprocessor 82 is connected to a location sensing element 86 that is mounted inside the handheld section 11. The microprocessor 82 drives the step motor 31 to turn back a home location when the threaded rod 33 is in contact with the location sensing element 86. The microprocessor 82 is respectively connected to an alarm element 87 and a tappet sensing element 88. When the tappet sensing element 88 detects that the aspirator is removed, the microprocessor 82 drives the alarm element 87 to sound the user there is a wrong operation.

Furthermore, the microprocessor 82 respectively connects to the LCD 13, the control key 14, the liquid picking/dispensing switch 15, the reset key 17, and the aspirator withdrawing key 20, so that the microprocessor 82 is operated according to commands from the above elements.

Figure 8:
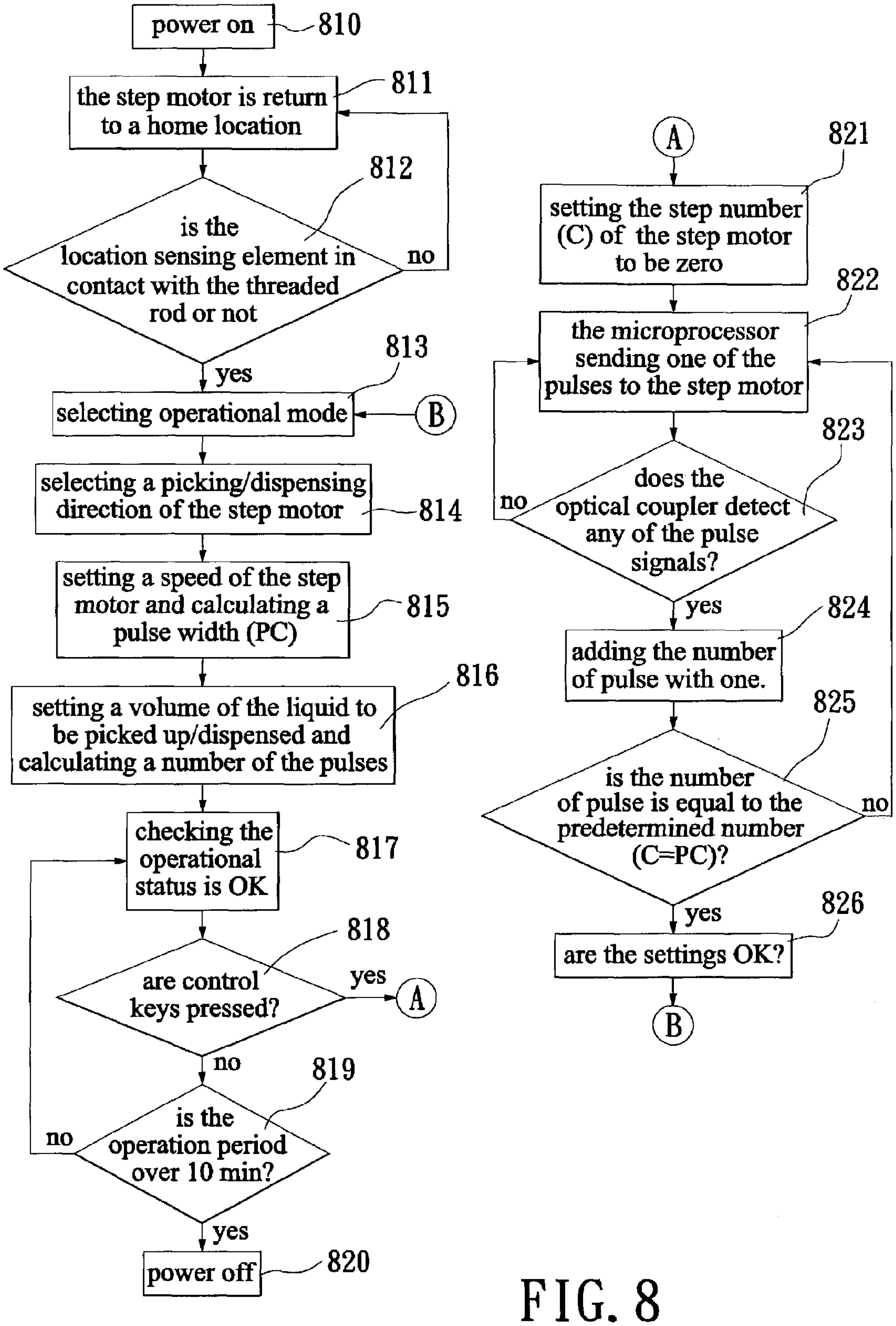
FIG. 8 is a flow chart showing the operation of a portable automated pipette according to one embodiment of the invention.

Referring to FIG. 8, the pipette of the invention is operated according to the sequential steps as follows.

The pipette is powered on (step 810).

The step motor returns to the home location (step 811).

It is determined whether the location sensing element is in contact with the threaded rod. If NO, then go to step 811. If YES, then it means that the step motor is at the home location, and go to steps 813–816.

In step 813, an operational mode, for example an automatic operation, a hybrid operation, a batch operation or a sequential operation, is selected.

In step 814, a picking/dispensing direction of the step motor is selected.

In step 815, a speed of the step motor is set and a pulse width (PC) is calculated.

In step 816, a volume of the liquid to be picked-up/dispensed is set and the number of pulses is calculated.

In step 817, it is checked if the operational status is OK.

In step 818, it is evaluated whether the control keys are pressed. If NO, then go to step 819, otherwise go to step 821.

In step 819, it is evaluated whether the operation period is over 10 min. If YES, then go to step 820. If NO, then return to step 817.

In step 820, the pipette is powered off.

In step 821, the number (C) of steps of the step motor is set to be zero.

In step 822, the microprocessor sends one of the pulses to the step motor.

In step 823, it is determined whether the optical coupler detects any of the pulse signals. If NO, then return to step 822, otherwise go to step 824.

In step 824, the number of pulse is added with 1.

In step 825, it is evaluated whether the number of pulse is equal to the predetermined number (C=PC). If NOT, then return to step 822, otherwise go to step 826.

In step 826, it is checked whether the settings are OK, and then return to step 813.

Thereby, the pipette of the invention can monitor the distance the step motor moves, and the alarm element 87 timely alerts the user to remove the aspirator.

Figure 9:
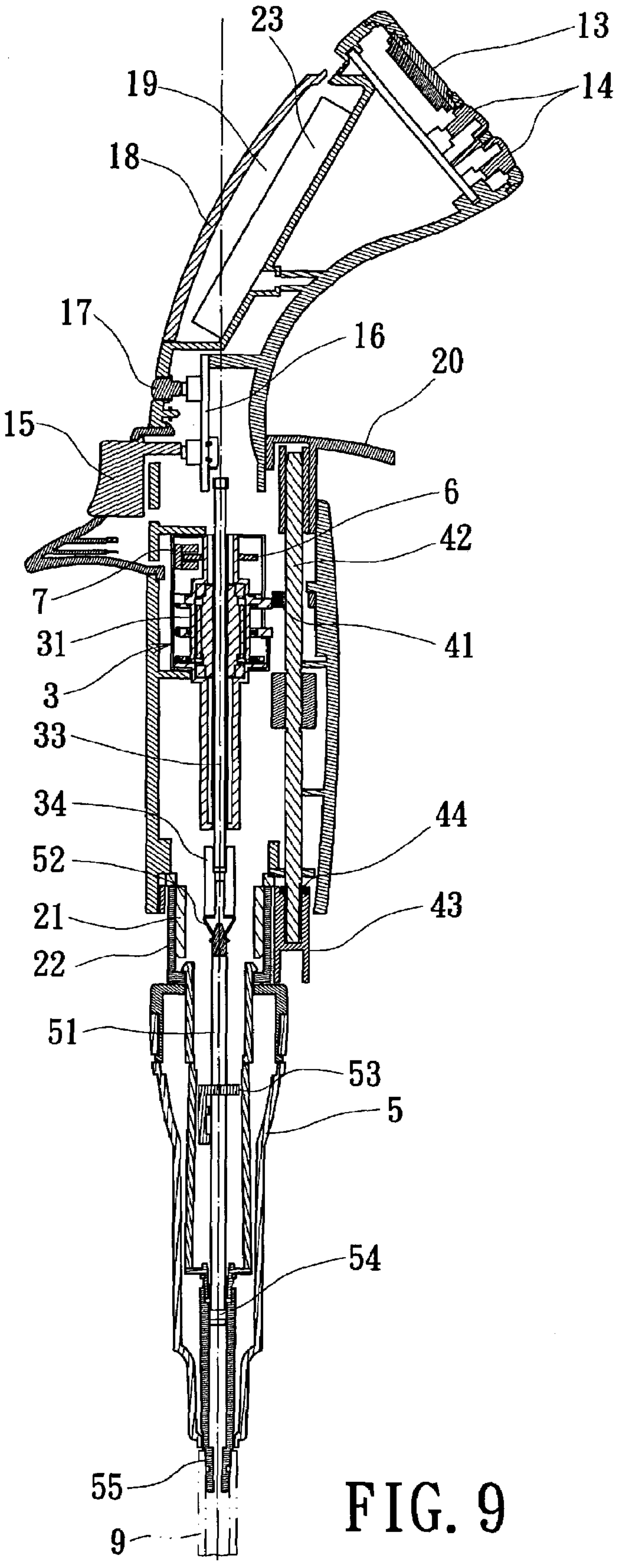
FIG. 9 is a schematic view showing a liquid picking operation of a portable automated pipette according to one embodiment of the invention.

Referring to FIG. 9, when the liquid is to be picked up, the user presses down the liquid picking/dispensing switch 15 according to the instruction shown on the LCD 13. Then, the control circuit 8 drives the loop 85 to actuate the step motor 31 to sequentially move the threaded rod 33, the propelling shaft 51 and the plunger 53. Thereby, the liquid is picked-up from the aspirator head 55.

Figure 10:
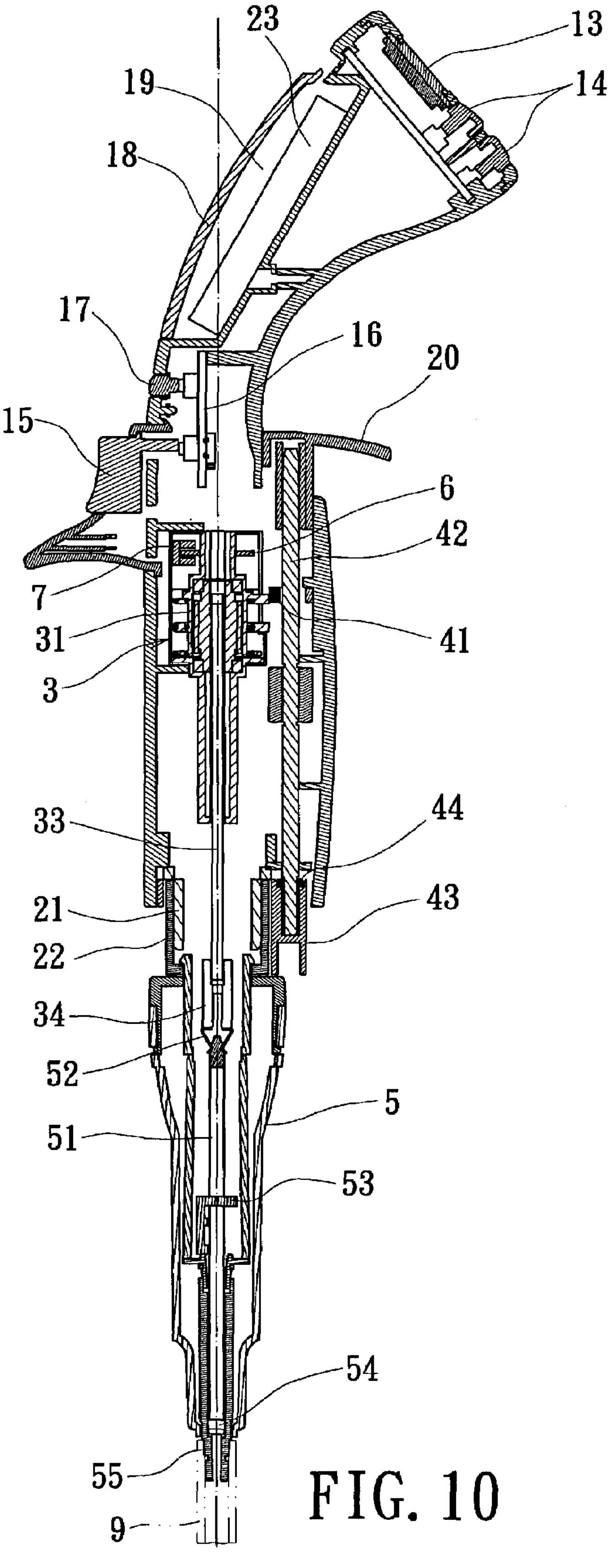
FIG. 10 is a schematic view showing a liquid dispensing operation of a portable automated pipette according to one embodiment of the invention.

Referring to FIG. 10, when the picked-up liquid is to be dispensed, the user presses down the liquid picking/dispensing switch 15 according to the instruction shown on the LCD 13. Then, the control circuit 8 drives the loop 85 to actuate the step motor 31 to sequentially move the threaded rod 33, the propelling shaft 51 and the plunger 53. Thereby, the liquid is dispensed out through the aspirator head 55.

Figure 11:
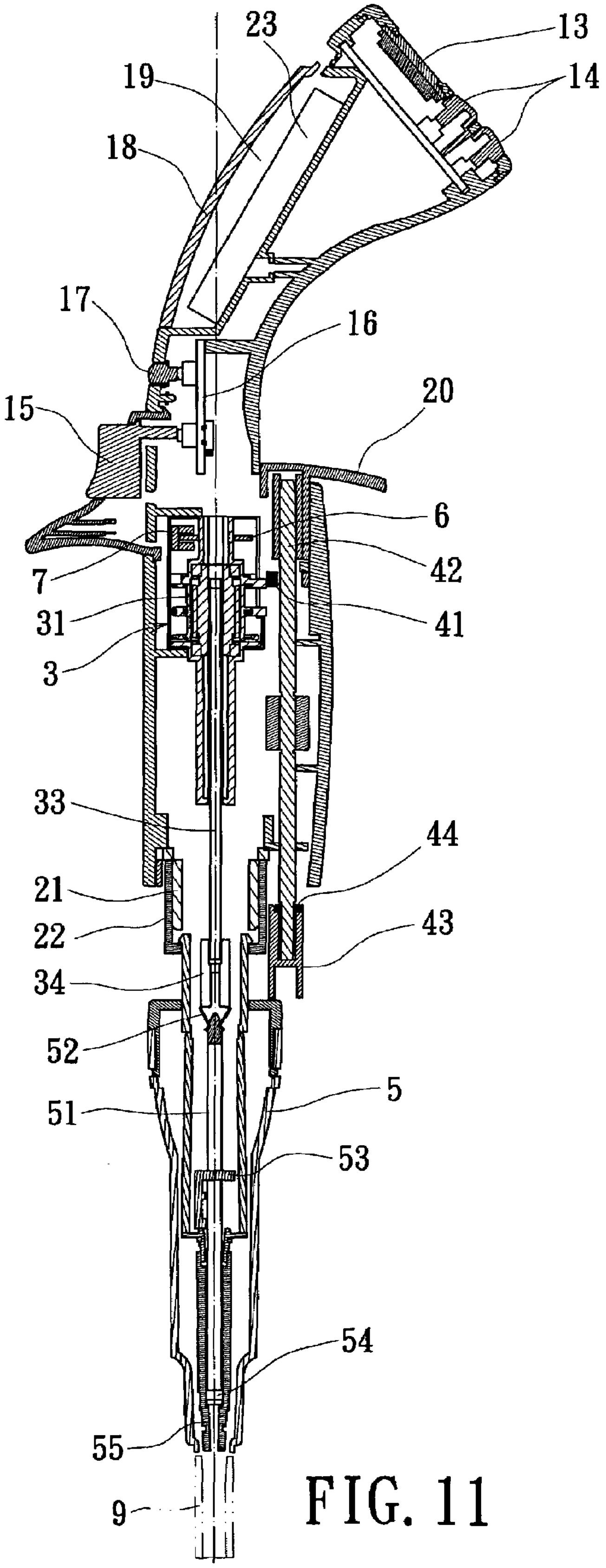
FIG. 11 is a schematic view showing an operation of an aspirator withdrawing key in a portable automated pipette according to one embodiment of the invention.

Referring to FIG. 11, once the aspirator withdrawing key 20 is pressed against the tappet 41 and then against the pad 43, the aspirator 9 is separated from the bottom of the aspirator casing 5. Therefore, the aspirator 9 can be removed after use of the pipette by pressing down the aspirator withdrawing key 20.

The liquid picking/dispensing switch 15 can be further programmed in a manner that the liquid picking/dispensing switch 15 works only at certain modes.

As described above, the invention therefore has the following advantages.

1. The step motor is operated in relation with the flywheel, the optical coupler and the control circuit. Therefore, the portable automated pipette can monitor the moving distance of the step motor.

2. The step motor can detect whether the aspirator is removed. The alarming element timely sounds the user to check if there is a wrong operation.

3. The adjusting ring of the adjusting device can adjust the displacement of the aspirator casing 5 relative to the handheld section 11. Therefore, the aspirator head can receive aspirators available from different suppliers.

4. The liquid picking/dispensing key can be given certain functions according to the programming of the control circuit.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A portable automated pipette. comprising:

a linear actuator including a step motor with a rotor;

a flywheel including a central shaft hole for receiving the rotor, and a plurality of apertures being formed around the central shaft hole on an internal surface of the flywheel;

an optical coupler arranged on two opposite sides of the flywheel, for detecting pulse signals sent from the apertures;

a control circuit respectively connected to the linear actuator and the optical coupler, for receiving the pulse signals from the optical coupler, comparing the received pulse signals with predetermined pulse signals, and driving the step motor to offset the detected pulse signals when there is deviation between the detected pulse signals and the predetermined pulse signals; and an adjusting device including a tappet and a tappet socket for fitting the tappet, a lower end of the tappet being attached to a pad, and an adjusting ring being further attached on the pad.

2. The pipette of claim 1, further comprising a tappet sensing element that detects whether an aspirator is removed, wherein when the tappet sensing element detects a removal of the aspirator, a microprocessor drives an alarm element to alert the user that there is a wrong operation.

3. The pipette of claim 1, wherein the rotor is pivotally connected to a threaded rod, a lower end of the threaded rod being connected to a shaft connector.

4. The pipette of claim 1, wherein the linear actuator is mounted inside a housing, a bottom of the housing being connected to a nut via a connecting member, and a bottom of the nut being connected to a top of an aspirator casing.

5. The pipette of claim 4, wherein the aspirator casing includes a propelling shaft therein, an upper end of the propelling shaft being connected to the shaft connector via a clip, a lower end of the propelling shaft being connected to a plunger that has a manifold connected to a plurality of aspirator heads.

* * * * *